United States Patent
Bansal et al.

(10) Patent No.: US 10,347,215 B2
(45) Date of Patent: Jul. 9, 2019

(54) MULTI-DEVICE ELECTRONIC SIGNATURE FRAMEWORK

(71) Applicant: Adobe Inc., San Jose, CA (US)

(72) Inventors: Rahul Bansal, Delhi (IN); Nikhil Dang, New Delhi (IN)

(73) Assignee: Adobe Inc., San Jose, CA (US)

( * ) Notice: Subject to any disclaimer, the term of this patent is extended or adjusted under 35 U.S.C. 154(b) by 245 days.

(21) Appl. No.: 15/166,979

(22) Filed: May 27, 2016

(65) Prior Publication Data

US 2017/0345394 A1    Nov. 30, 2017

(51) Int. Cl.

| | |
|---|---|
| G09G 5/12 | (2006.01) |
| H04L 29/06 | (2006.01) |
| H04W 12/06 | (2009.01) |
| G06K 19/06 | (2006.01) |
| G06F 3/03 | (2006.01) |
| G06F 3/14 | (2006.01) |
| G06F 21/64 | (2013.01) |
| G06F 3/0488 | (2013.01) |

(52) U.S. Cl.
CPC .............. *G09G 5/12* (2013.01); *G06F 3/0304* (2013.01); *G06F 3/0488* (2013.01); *G06F 3/1423* (2013.01); *G06F 3/1454* (2013.01); *G06F 21/64* (2013.01); *G06K 19/06028* (2013.01); *H04L 63/0838* (2013.01); *H04L 63/0861* (2013.01); *H04W 12/06* (2013.01); *G09G 2354/00* (2013.01)

(58) Field of Classification Search
CPC .. G06F 3/04883; G06F 3/0304; G06F 3/1453; G06F 3/1423; H04L 9/3247

USPC ........................................................... 726/4
See application file for complete search history.

(56) References Cited

U.S. PATENT DOCUMENTS

| | | |
|---|---|---|
| 4,621,334 A | 11/1986 | Garcia |
| 4,805,222 A | 2/1989 | Young |
| 5,825,880 A | 10/1998 | Sudia et al. |
| 5,910,987 A | 6/1999 | Ginter et al. |
| 6,073,101 A | 6/2000 | Maes |

(Continued)

FOREIGN PATENT DOCUMENTS

WO    0148986 A1    7/2001

OTHER PUBLICATIONS

Notice of Allowance received in U.S. Appl. No. 14/534,583 (8 pages) (dated May 2, 2017).

(Continued)

*Primary Examiner* — Aravind K Moorthy
*Assistant Examiner* — Peiliang Pan
(74) *Attorney, Agent, or Firm* — Finch & Maloney PLLC

(57) ABSTRACT

A user manipulates a document using a desktop computer with a large screen. Upon deciding to sign the document, the user invokes a "Sign with Mobile" workflow that causes a two-dimensional barcode to be displayed. Using a signature acquisition application executing on his or her smartphone, the user scans the displayed barcode and creates an electronic signature by snapping a photograph of a conventional pen-and-paper signature or by detecting a handwritten signature drawn on a touch sensitive surface. The signature acquisition application sends the resulting electronic signature to the desktop computer, for example via an electronic signature server. The user is then able to apply the electronic signature to the document as desired.

16 Claims, 11 Drawing Sheets

(56) References Cited

U.S. PATENT DOCUMENTS

| | | | |
|---|---|---|---|
| 6,091,835 A | 7/2000 | Smithies et al. | |
| 6,157,935 A | 12/2000 | Tran et al. | |
| 6,240,091 B1 | 5/2001 | Ginzboorg et al. | |
| 6,615,234 B1 | 9/2003 | Adamske et al. | |
| 6,691,089 B1 | 2/2004 | Su et al. | |
| 6,928,421 B2 | 8/2005 | Craig et al. | |
| 6,959,382 B1 | 10/2005 | Kinnis et al. | |
| 7,206,938 B2 | 4/2007 | Bender | |
| 7,562,053 B2 | 7/2009 | Twining | |
| 7,581,109 B2 | 8/2009 | De Boursetty et al. | |
| 7,694,143 B2 | 4/2010 | Karimisetty et al. | |
| 7,779,355 B1 | 8/2010 | Erol et al. | |
| 7,895,166 B2 | 2/2011 | Foygel et al. | |
| 7,996,367 B2 | 8/2011 | Foygel et al. | |
| 7,996,439 B2 | 8/2011 | Foygel et al. | |
| 8,126,868 B1 | 2/2012 | Vincent | |
| 8,230,232 B2 | 7/2012 | Ahmed | |
| 8,234,494 B1 | 7/2012 | Bansal et al. | |
| 8,316,237 B1* | 11/2012 | Felsher | H04L 9/0825 380/282 |
| 8,332,253 B1 | 12/2012 | Farmer | |
| 8,443,443 B2 | 5/2013 | Nordstrom | |
| 8,844,055 B2 | 9/2014 | Follis et al. | |
| 8,918,311 B1 | 12/2014 | Johnson et al. | |
| 8,930,308 B1 | 1/2015 | Johnson et al. | |
| 9,058,515 B1 | 6/2015 | Amtrup et al. | |
| 9,059,858 B1 | 6/2015 | Giardina et al. | |
| 9,292,876 B1 | 3/2016 | Shimkus | |
| 9,741,085 B2* | 8/2017 | Avni | G06T 1/0021 |
| 9,807,073 B1 | 10/2017 | Miller | |
| 2001/0002485 A1 | 5/2001 | Brisbee | |
| 2002/0038290 A1 | 3/2002 | Cochran et al. | |
| 2002/0062322 A1 | 5/2002 | Genghini | |
| 2002/0091651 A1 | 7/2002 | Petrogiannis | |
| 2002/0095290 A1 | 7/2002 | Kahn et al. | |
| 2002/0103656 A1 | 8/2002 | Bahler et al. | |
| 2002/0150241 A1* | 10/2002 | Scheidt | H04L 9/321 380/44 |
| 2003/0009513 A1 | 1/2003 | Ludwig et al. | |
| 2003/0037004 A1 | 2/2003 | Buffum et al. | |
| 2003/0074216 A1 | 4/2003 | Salle | |
| 2003/0083906 A1 | 5/2003 | Howell et al. | |
| 2003/0125054 A1* | 7/2003 | Garcia | G06F 3/04883 455/466 |
| 2003/0130953 A1 | 7/2003 | Narasimhan et al. | |
| 2003/0154083 A1 | 8/2003 | Kobylevsky et al. | |
| 2003/0177361 A1 | 9/2003 | Wheeler | |
| 2003/0187671 A1 | 10/2003 | Kumhyr et al. | |
| 2003/0217275 A1 | 11/2003 | Bentley et al. | |
| 2004/0024688 A1 | 2/2004 | Bi et al. | |
| 2004/0088587 A1* | 5/2004 | Ramaswamy | G06F 21/31 726/5 |
| 2004/0102959 A1 | 5/2004 | Estrin | |
| 2004/0139344 A1 | 7/2004 | Maurer | |
| 2004/0167847 A1 | 8/2004 | Nathan | |
| 2004/0187037 A1 | 9/2004 | Checco | |
| 2004/0204939 A1 | 10/2004 | Liu et al. | |
| 2004/0225887 A1 | 11/2004 | O'Neil et al. | |
| 2004/0243811 A1 | 12/2004 | Frisch et al. | |
| 2004/0264652 A1 | 12/2004 | Erhart et al. | |
| 2005/0132196 A1 | 6/2005 | Dietl | |
| 2005/0228665 A1 | 10/2005 | Kobayashi | |
| 2005/0228999 A1 | 10/2005 | Jerdonek et al. | |
| 2005/0289345 A1 | 12/2005 | Haas et al. | |
| 2006/0020460 A1 | 1/2006 | Itou | |
| 2006/0041828 A1 | 2/2006 | King et al. | |
| 2006/0110011 A1 | 5/2006 | Cohen et al. | |
| 2006/0122880 A1 | 6/2006 | Franco | |
| 2006/0143462 A1 | 6/2006 | Jacobs | |
| 2006/0157559 A1 | 7/2006 | Levy et al. | |
| 2006/0182245 A1* | 8/2006 | Steinmetz | G06Q 10/10 379/127.01 |
| 2006/0212813 A1 | 9/2006 | Yalovsky et al. | |
| 2006/0253324 A1 | 11/2006 | Miller | |
| 2006/0280339 A1 | 12/2006 | Cho | |
| 2007/0055517 A1 | 3/2007 | Spector | |
| 2007/0113164 A1 | 5/2007 | Hansen et al. | |
| 2007/0124507 A1 | 5/2007 | Gurram et al. | |
| 2007/0143398 A1 | 6/2007 | Graham | |
| 2007/0220614 A1 | 9/2007 | Ellis et al. | |
| 2007/0226511 A1 | 9/2007 | Wei et al. | |
| 2008/0015883 A1 | 1/2008 | Hermann | |
| 2008/0177550 A1 | 7/2008 | Mumm et al. | |
| 2008/0180213 A1 | 7/2008 | Flax | |
| 2008/0195389 A1 | 8/2008 | Zhang et al. | |
| 2008/0209229 A1 | 8/2008 | Ramakrishnan | |
| 2009/0025087 A1 | 1/2009 | Peirson | |
| 2009/0062944 A1 | 3/2009 | Wood et al. | |
| 2009/0079546 A1* | 3/2009 | Beenau | G06Q 20/00 340/10.1 |
| 2009/0112767 A1 | 4/2009 | Hammad et al. | |
| 2009/0116703 A1 | 5/2009 | Schultz | |
| 2009/0117879 A1 | 5/2009 | Pawar et al. | |
| 2009/0177300 A1 | 7/2009 | Lee | |
| 2009/0222269 A1 | 9/2009 | Mori | |
| 2009/0228584 A1 | 9/2009 | Maes et al. | |
| 2009/0254345 A1 | 10/2009 | Fleizach et al. | |
| 2009/0254572 A1 | 10/2009 | Redlich et al. | |
| 2009/0260060 A1 | 10/2009 | Smith et al. | |
| 2009/0307744 A1 | 12/2009 | Nanda et al. | |
| 2009/0327735 A1 | 12/2009 | Feng et al. | |
| 2010/0131533 A1 | 5/2010 | Ortiz | |
| 2010/0161993 A1 | 6/2010 | Mayer | |
| 2010/0235285 A1* | 9/2010 | Hoffberg | G06Q 20/401 705/75 |
| 2010/0281254 A1 | 11/2010 | Carro | |
| 2010/0306670 A1 | 12/2010 | Quinn et al. | |
| 2011/0022940 A1 | 1/2011 | King et al. | |
| 2011/0047385 A1 | 2/2011 | Kleinberg | |
| 2011/0093777 A1 | 4/2011 | Dunn et al. | |
| 2011/0212717 A1 | 9/2011 | Rhoads et al. | |
| 2011/0225485 A1 | 9/2011 | Schnitt | |
| 2012/0072837 A1 | 3/2012 | Triola | |
| 2012/0190405 A1 | 7/2012 | Kumaran | |
| 2012/0192250 A1* | 7/2012 | Rakan | G06F 3/03545 726/2 |
| 2012/0254332 A1 | 10/2012 | Irvin | |
| 2013/0006642 A1 | 1/2013 | Saxena et al. | |
| 2013/0046645 A1 | 2/2013 | Grigg et al. | |
| 2013/0089300 A1 | 4/2013 | Soundararajan et al. | |
| 2013/0103723 A1 | 4/2013 | Hori | |
| 2013/0132091 A1 | 5/2013 | Skerpac | |
| 2013/0138438 A1 | 5/2013 | Bachtiger | |
| 2013/0166915 A1 | 6/2013 | Desai et al. | |
| 2013/0166916 A1* | 6/2013 | Wu | H04L 9/3281 713/176 |
| 2013/0179171 A1 | 7/2013 | Howes | |
| 2013/0182002 A1 | 7/2013 | Macciola et al. | |
| 2013/0191287 A1 | 7/2013 | Gainer et al. | |
| 2013/0263283 A1 | 10/2013 | Peterson | |
| 2013/0269013 A1 | 10/2013 | Parry et al. | |
| 2013/0283189 A1 | 10/2013 | Basso et al. | |
| 2013/0326225 A1 | 12/2013 | Murao | |
| 2013/0339358 A1 | 12/2013 | Huibers et al. | |
| 2013/0346356 A1 | 12/2013 | Welinder et al. | |
| 2014/0007001 A1* | 1/2014 | Li | G06F 3/04883 715/780 |
| 2014/0007002 A1* | 1/2014 | Chang | G06F 3/04883 715/780 |
| 2014/0019761 A1 | 1/2014 | Shapiro | |
| 2014/0019843 A1 | 1/2014 | Schmidt | |
| 2014/0078544 A1 | 3/2014 | Motoyama et al. | |
| 2014/0079297 A1 | 3/2014 | Tadayon et al. | |
| 2014/0108010 A1 | 4/2014 | Maltseff et al. | |
| 2014/0168716 A1 | 6/2014 | King et al. | |
| 2014/0236978 A1 | 8/2014 | King et al. | |
| 2014/0244451 A1 | 8/2014 | Mayer | |
| 2014/0279324 A1 | 9/2014 | King | |
| 2014/0282243 A1 | 9/2014 | Eye et al. | |
| 2014/0294302 A1 | 10/2014 | King et al. | |
| 2014/0343943 A1 | 11/2014 | Al-Telmissani | |
| 2014/0365281 A1 | 12/2014 | Onischuk | |
| 2014/0372115 A1 | 12/2014 | LeBeau et al. | |

(56) References Cited

U.S. PATENT DOCUMENTS

| | | |
|---|---|---|
| 2015/0012417 A1 | 1/2015 | Joao et al. |
| 2015/0016661 A1 | 1/2015 | Lord |
| 2015/0063714 A1 | 3/2015 | King et al. |
| 2015/0073823 A1 | 3/2015 | Ladd et al. |
| 2015/0100578 A1 | 4/2015 | Rosen et al. |
| 2015/0127348 A1 | 5/2015 | Follis |
| 2015/0128217 A1 | 5/2015 | Yasaki et al. |
| 2015/0172058 A1 | 6/2015 | Follis |
| 2015/0186634 A1* | 7/2015 | Crandell ............ G06F 21/32 713/186 |
| 2015/0213404 A1 | 7/2015 | Follis |
| 2015/0245111 A1 | 8/2015 | Berry et al. |
| 2015/0294094 A1 | 10/2015 | Hefeeda |
| 2016/0078869 A1 | 3/2016 | Syrdal et al. |
| 2016/0087800 A1* | 3/2016 | Weissinger .......... H04W 12/08 713/176 |
| 2016/0132693 A1 | 5/2016 | Kumar et al. |
| 2016/0149707 A1 | 5/2016 | Follis |
| 2016/0191251 A1* | 6/2016 | Alkhalaf ............ G06F 3/03545 713/176 |
| 2016/0306816 A1* | 10/2016 | Morales, Jr. ....... G06F 17/30091 |
| 2017/0046560 A1* | 2/2017 | Tsur ...................... G06F 21/32 |
| 2018/0137354 A1 | 5/2018 | Nowak et al. |

OTHER PUBLICATIONS

Craig Le Clair, "What to Look for in E-Signature Providers" (Nov. 15, 2011). Available at https://www.echosign.adobe.com/content/dam/echosign/docs/pdfs/Forrester_What_To_Look_For_In_E-Signature_Providers_Nov_2011.pdf.

EchoSign Jan. 2015 Release, retrieved from <https://www.echosign.adobe.com/content/dam/echosign/docs/pdfs/AdobeES_JanuaryRelease_WhatsNew.pdf> on Aug. 24, 2015.

U.S. Appl. No. 14/625,852, filed Feb. 19, 2015.

U.S. Appl. No. 14/840,380, filed Aug. 31, 2015.

Notice of Allowance received in U.S. Appl. No. 14/069,674 (8 pages) (dated Jan. 24, 2018).

Simske, Steven J. Dynamic Biometrics: The Case for a Real-Time Solution to the Problem of Access Control, Privacy and Security. 2009 First IEEE International Conference on Biometrics, Identiy and Security. Pub. Date: 2009. http://ieeexplore.ieee.org/stamp/stamp.jsp?tp=&arnumber=5507535.

Maeder, Anthony; Fookes, Clinton; Sridharan, Sridha. Gaze Based User Authentication for Personal Computer Applications. Proceedings of 2004 International Symposium on Intelligent Multimedia, Video and Speech Processing. Pub. Date: 2004. http://ieeexplore.ieee.org/stamp/stamp.jsp?tp=&arnumber=1434167.

Notice of Allowance received in U.S. Appl. No. 14/625,852 (dated Jul. 25, 2016).

Notice of Allowance received in U.S. Appl. No. 14/107,967 (dated Nov. 3, 2016) (6 pages).

Notice of Allowance received in U.S. Appl. No. 14/551,560 (dated Nov. 4, 2016) (19 pages).

Araújo et al., "User Authentication Through Typing Biometrics Features", IEEE Transactions on Signal Processing, vol. 53, No. 2, pp. 851-855 (2005).

Deng et al., "Keystroke Dynamics User Authentication Based on Gaussian Mixture Model and Deep Belief Nets", ISRN Signal Processing, vol. 2013, Article ID 565183, 7 pages (2013).

Moskovitch et al., "Identity Theft, Computers and Behavioral Biometrics", Proceedings of the 2009 IEEE International Conference on Intelligence and Security Informatics, pp. 155-160 (2009).

"TypingDNA Authentication API", version 2.1.0 (Feb. 12, 2016), retreived from <http://api.typingdna.com/index.html>.

Notice of Allowance in related U.S. Appl. No. 14/859,944 dated Mar. 1, 2017, 10 pages.

U.S. Appl. No. 14/859,944, filed Sep. 21, 2015.

Notice of Allowance received in U.S. Appl. No. 14/840,380 (11 pages) (dated Aug. 23, 2017).

Notice of Allowance received in U.S. Appl. No. 15/363,433 (6 pages) (dated Nov. 6, 2018).

Notice of Allowance received in U.S. Appl. No. 15/707,538 (15 pages) (dated Apr. 9, 2019).

* cited by examiner

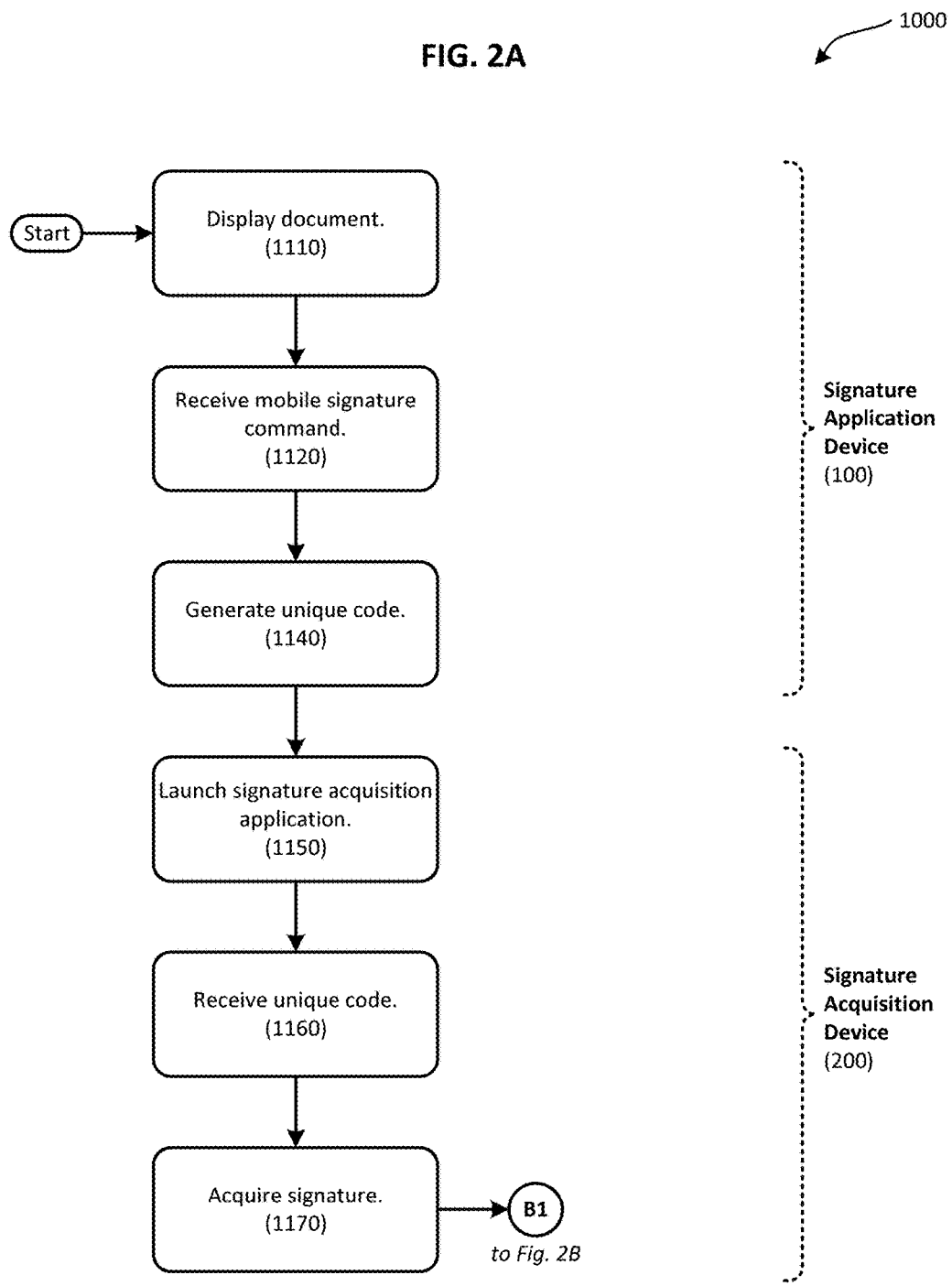

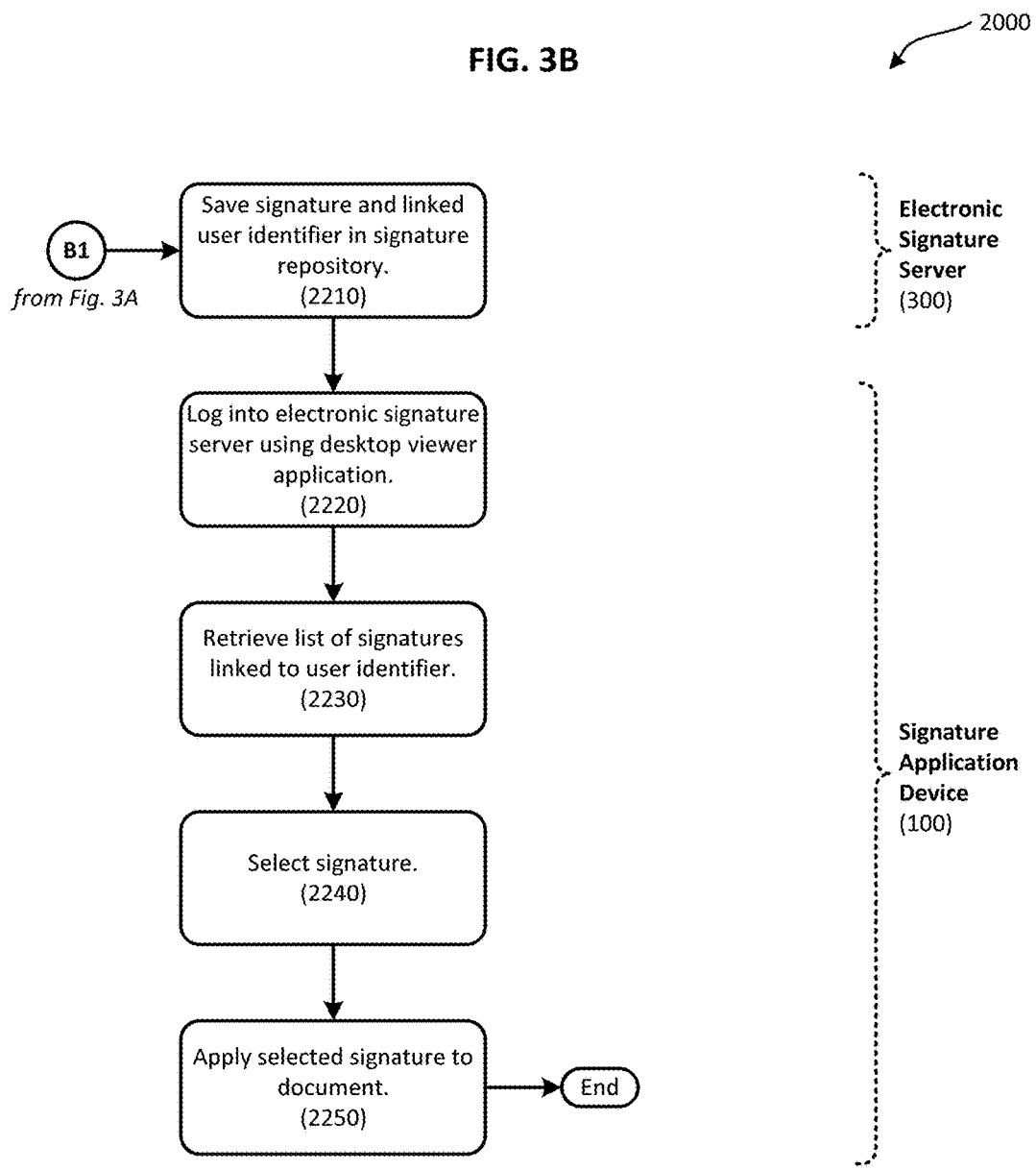

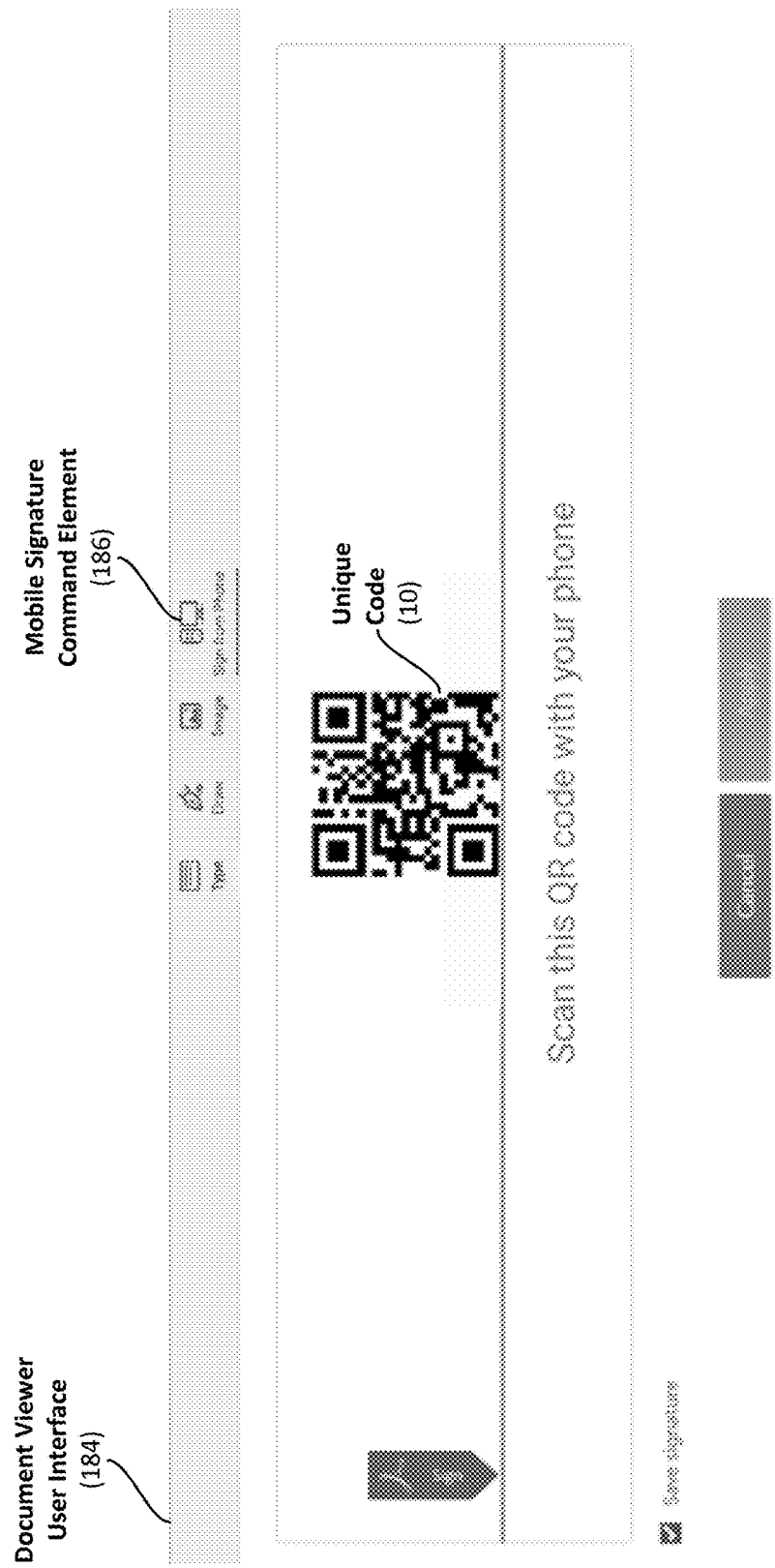

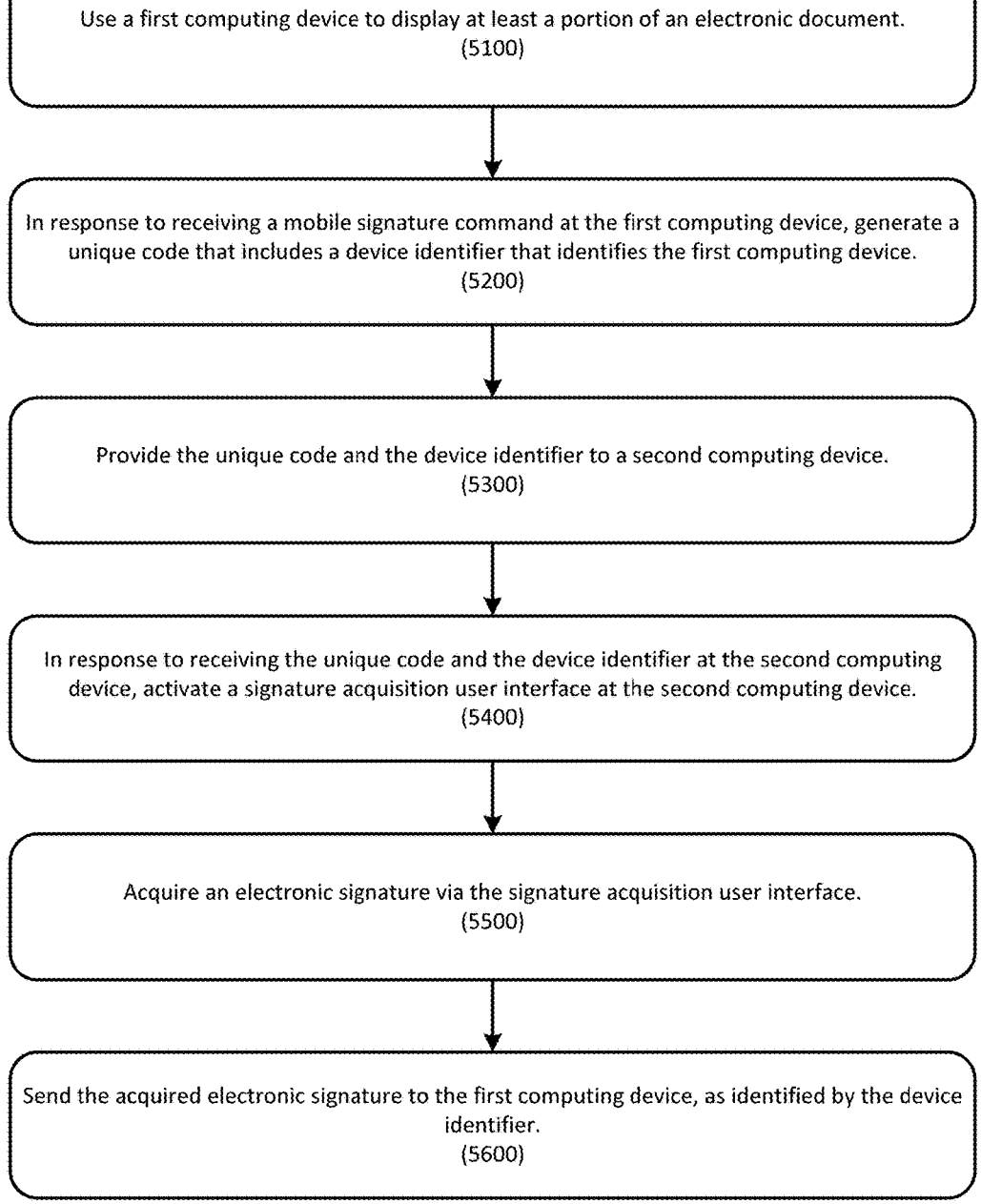

MULTI-DEVICE ELECTRONIC SIGNATURE FRAMEWORK

FIELD OF THE DISCLOSURE

This disclosure relates generally to document processing workflows, and more specifically to workflows that allow an electronic signature to be acquired and applied to a document using multiple devices.

BACKGROUND

Computers and electronic documents have become an increasingly indispensable part of modern life. Indeed, electronic documents are rapidly gaining acceptance as a convenient replacement for conventional paper documents. The growing popularity of electronic documents has resulted in the adaptation of conventional paper-based document processing workflows to the electronic realm. One such adaptation has been the increased use and acceptance of electronic signatures on agreements, contracts, and other documents. For example, when negotiating parties reach an agreement with respect to a course of action, state of affairs, or other subject matter, the resulting agreement is usually reduced to writing and executed by the parties as a way to memorialize the terms of the agreement. Since this "reduction to writing" now often takes the form of an electronic document stored on a computer readable medium, electronic signatures have become commonplace and have indeed gained widespread legal recognition. See, for example, the Electronic Signatures in Global and National (ESIGN) Commerce Act, 15 U.S.C. § 96. The wide variety of different formats and legal requirements relating to electronic signatures has resulted in a correspondingly wide variety of workflows that facilitate the application of an electronic signature to a document. Electronic signature workflows are influenced by the wide range of computing devices that are used to interact with electronic documents and generate electronic signatures.

An electronic signature is created when a representation of a person's signature is recorded digitally. One way of accomplishing this is to draw the signature on a touch sensitive surface using a stylus, finger, or other pointing device. Another way of creating an electronic signature is to write the signature on a piece of paper using a conventional writing utensil, and then scan or photograph the written signature. Signature acquisition techniques such as these are readily implemented using technology provided by handheld electronic devices such as smartphones and tablet computers. In particular, the touch sensitive surfaces and cameras that often form part of modern handheld devices make it easy to draw or photograph a signature. The convenience of using a handheld device to record an electronic signature is in contrast to the difficulty of using a device such as a desktop or laptop computer to accomplish this same task. In particular, desktop and laptop computers often lack integrated touch sensitive surfaces or cameras. And while such devices may include a mouse, drawing a signature using a mouse is both difficult and inaccurate. Users therefore often find the process of electronically recording a signature using a desktop, laptop, or other similar device to be cumbersome. However, notwithstanding these challenges, many users still prefer working with a desktop or laptop computer because such devices usually have a relatively larger screen as compared to handheld electronic devices. The importance of a larger display is particularly significant for a user who often works with lengthy documents. Given the foregoing, users are forced to choose between a convenient electronic signature experience using a handheld device that makes document review cumbersome, or a cumbersome electronic signature experience using a device having a relatively larger display that makes document manipulation convenient.

BRIEF DESCRIPTION OF THE DRAWINGS

FIGS. 2A through 2C comprise a flowchart illustrating an example method that allows an unregistered user to apply an electronic signature to a document that is displayed on a signature application device, wherein the electronic signature is acquired using a signature acquisition device.

FIGS. 3A and 3B comprise a flowchart illustrating an example method that allows a registered user to apply an electronic signature to a document that is displayed on a signature application device, wherein the electronic signature is acquired using a signature acquisition device.

FIG. 4A is a screenshot illustrating an example user interface that is provided on a signature application device, and that displays a unique code that links the signature application device to an electronic signature acquired using a signature acquisition device.

FIG. 5 is a flowchart illustrating an example process for acquiring an electronic signature and applying the acquired electronic signature to a document.

DETAILED DESCRIPTION

Figure 1:
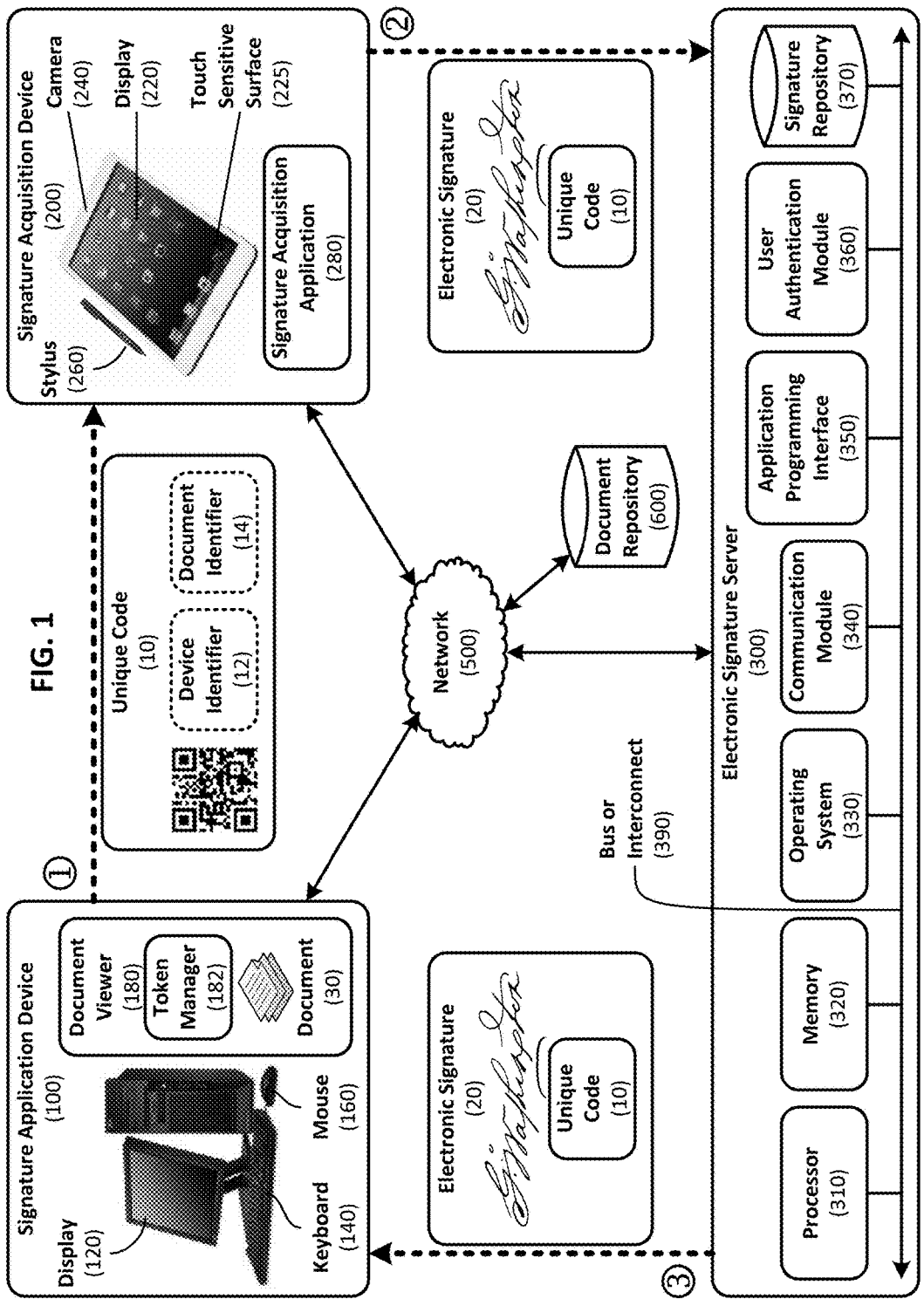
FIG. 1 is a block diagram illustrating selected components of an example electronic signature framework that allows an electronic signature to be applied to a document using multiple devices.

As noted above, existing electronic signature solutions require a user to choose between a convenient electronic signature experience using a handheld device that makes document review cumbersome, or a cumbersome electronic signature experience using a device having a relatively larger display that makes document manipulation convenient. Disclosed herein are improved electronic signature workflows that allow a user to have the best of both worlds. In particular, certain embodiments allow a user to easily work with lengthy documents on a device with a relatively larger display, while still leveraging the convenience of recording a signature with a touch sensitive surface or camera provided by a handheld device. For example, in one implementation a user manipulates a document using a desktop computer with a large screen. Upon deciding to sign the document, the user invokes a "Sign with Mobile" workflow that causes a barcode or other unique code to be displayed. Using a signature acquisition application executing on his or her smartphone, the user scans the displayed barcode and creates an electronic signature by snapping a photograph of a conventional pen-and-paper signature. The signature acquisition application sends the resulting electronic signature to the desktop computer, and more specifically, to the application used to manipulate the document on the desktop computer. For example, in one implementation the electronic signature is sent to the desktop computer via an electronic signature server. The user is then able to apply the electronic signature to the document as desired. Once the user acquires an electronic signature using his or her smartphone, the acquired signature is made available to the user at his or her desktop computer. The barcode or other unique code provides a link between the desktop computer and the acquired signature. Numerous alternative configurations and modifications of this workflow will be apparent in light of this disclosure.

Allowing a user to apply an electronic signature to a document using multiple devices, for example using a desktop computer and a smartphone, allows the user to leverage the most beneficial aspects of each device. For example, a desktop computer, with its relatively larger display, can be used for document review and manipulation, while a smartphone, with its touch sensitive surface and camera, can be used to acquire an electronic signature. The result is a reliable and secure electronic signature framework that effectively makes the user's handheld device function as a signature acquisition accessory that is a seamless extension of a device with a larger display. This eliminates any need to synchronize or transmit the document to be signed between devices, thus improving workflow efficiency and security. It also eliminates any need to connect additional hardware, such as a stylus or a digital camera, to the desktop computer, thus saving time and money. The electronic signature framework can be implemented without requiring user registration, although registration does provide additional benefits such as the ability to save acquired signatures for future use. These and other advantages will be apparent in view of the disclosure provided herein.

As used herein, the terms "document" and "electronic document" both refer, in addition to their respective ordinary meanings, to any collection of information that can be accessed by users of the various systems disclosed herein. A document can be rendered in a variety of different ways, such as via display on a screen, by printing using an output device, or aurally using an audio player and text-to-speech software. Thus, it will be appreciated that a document may include digital assets in addition to or instead of text; such digital assets may include, for example, audio clips, video clips, photographs, and other multimedia assets. For instance, an artist may use the framework described herein to apply an electronic signature to a digital image that he or she has created. Documents may encompass a virtually unlimited range of subject matter, including documents that contain terms that are to be agreed to amongst various participants in a given workflow. Examples of documents therefore include agreements, settlements, and legally binding contracts. Documents may be communicated amongst users by a variety of techniques, including wired or wireless transmission of digital data.

As used herein, the term "electronic signature" refers, in addition to its ordinary meaning, to data that can be attached to, or logically associated with, an electronic document. Thus an electronic signature may comprise, for example, a string of characters, a digital key, a bitmap image such as an image of a handwritten signature, a digitized animation of a handwritten signature, an audio or visual recording of a person reciting a spoken phase such as "I agree to these terms", a visual recording of a person performing a sequence of physical gestures, or any suitable combination of the foregoing. Electronic signatures may or may not be encrypted or otherwise encoded in a way that limits access or modification by unauthorized third parties. An electronic signature may be personalized and associated with a particular individual, or may be generated automatically in response to a specified user input, such as the selection of an electronic checkbox, the checking of a button in a graphical user interface, or the generation of a touchtone using a telephone keypad. An electronic signature need not be incorporated into a particular electronic document, but may simply be stored as a standalone asset in a resource managed by, for example, an electronic signature server. In such embodiments the electronic signature server can be used to create a logical association between an electronic signature and a particular electronic document. Where an electronic signature is encoded using binary digits, it may also be referred to as a "digital signature". Examples of products which provide services associated with an electronic signature server include ADOBE® Document Cloud (Adobe Systems Incorporated, San Jose, Calif.), and DOCUSIGN® eSignature (DocuSign, Inc., San Francisco, Calif.).

As used herein, the term "signature application device" refers to a computing device that is used to apply an existing electronic signature to a document. In many applications, a signature application device will be well-suited for accessing, viewing, editing, and otherwise manipulating an electronic document, but will be less well-suited for acquiring an electronic signature. For example, in one implementation the signature application device is a desktop computer, a laptop computer, a netbook, or the like that provides a relatively large display screen, but that does not include an integrated touch sensitive surface or camera. However, it should be noted that, at a fundamental level, the term "signature application device" is defined in terms of how a particular device is used in a particular implementation, and not by the functional capabilities of that device.

Likewise, as used herein, the term "signature acquisition device" refers to a computing device that is used to acquire an electronic signature. In many applications, a signature acquisition device will be well-suited for detecting a signature drawn using a pointing device such as a finger or a stylus, or for snapping a photograph of a handwritten signature, but will be less well-suited for viewing, editing, and otherwise manipulating an electronic document. For example, in one implementation the signature acquisition device is a smartphone or tablet computer that includes an integrated camera and touch sensitive surface, but that has a relatively smaller display screen as compared to a signature application device. However, it should be noted that, at a fundamental level, the term "signature acquisition device" is defined in terms of how a particular device is used in a particular implementation, and not by the functional capabilities of that device.

System Architecture

FIG. 1 is a block diagram illustrating selected components of an example electronic signature framework that allows an electronic signature 20 to be acquired and applied to a document 30 using multiple devices. More specifically, a signature application device 100 is used to review document 30 and apply electronic signature 20 thereto, while a signature acquisition device 200 is used to acquire electronic signature 20. In certain implementations, workflows provided within such a framework are orchestrated by an optional electronic signature server 300. Signature application device 100, signature acquisition device 200, and electronic signature server 300 communicate with each other via a network 500. Network 500 can also be used to access optional supplementary resources such as a cloud-based document repository 600 from which document 30 can be retrieved. Other embodiments may invoke fewer or more devices and resources depending on the granularity of a particular implementation. The various embodiments disclosed herein therefore are not limited to provision or exclusion of any particular devices or resources.

In certain embodiments signature application device 100 comprises a desktop computer that includes a display 120, a text-based input device such as a keyboard 140, and a pointer-based input device such as a mouse 160. Signature application device 100 can be implemented using other types of computing devices in other embodiments, examples of which include a netbook and a laptop computer. In general, signature application device 100 enables a user to generate, modify, retrieve, view, and otherwise manipulate document 30, and thus in certain embodiments display 120 is a large-format display that facilitates such operations. In some cases display 120 comprises a plurality of individual display devices arranged adjacent to each other. Signature application device 100 also includes software configured to implement the various functionalities disclosed herein, including an operating system, device drivers, and one or more applications capable of manipulating document 30. In the example embodiment illustrated in FIG. 1, such software includes a document viewer 180, although other applications such as word processors, spreadsheet applications, web browsers, document management systems, and image editors can be implemented as well. One example of document viewer 180 is ADOBE® ACROBAT® READER® DC (Adobe Systems Incorporated, San Jose, Calif.).

Document viewer 180 optionally includes a token manager 182 which is capable of generating a unique code 10. In one embodiment, unique code 10 is optionally encoded with a device identifier 12 that identifies the device that was used to generate unique code 10. Unique code 10 is also optionally encoded with a document identifier 14 that identifies a document that was being viewed using document viewer 180 when unique code 10 was generated. Unique code 10 provides a link between signature application device 100 and electronic signature 20 acquired by signature acquisition device 200. In an alternative embodiment, unique code 10 is generated by electronic signature server 300, delivered to signature application device 100, and subsequently delivered to signature acquisition device 200. In certain implementations unique code 10 is rendered in the form of a two-dimensional barcode provided on display 120, although in other embodiments other representations can be used, such as a one-dimensional barcode, a color barcode, an audibly-rendered password or passphrase, or a globally unique identifier (GUID). In one particular implementation, a GUID having 32 hexadecimal digits is displayed.

Signature acquisition device 200 comprises a tablet computer that includes a display 220 having a touch sensitive surface 225 and a camera 240. In an alternative implementation, signature acquisition device 200 comprises a handheld computer that includes a display 220 and a camera. A stylus 260 is optionally provided to facilitate input provided via touch sensitive surface 225. Signature acquisition device 200 can be implemented using other types of computing devices having similar features and capabilities, examples of which include a smartphone and a handheld computer. In general, signature acquisition device 200 enables a user to acquire electronic signature 20, such as by receiving a handwritten signature traced over touch sensitive surface 225, or by using camera 240 to snap a photograph of a signature written on a piece of paper or other surface.

Signature acquisition device 200 optionally includes software configured to implement the various functionalities disclosed herein, including an operating system and a signature acquisition application 280. In one implementation signature acquisition application 280 includes interfaces capable of receiving unique code 10 that was generated by signature application device 100. For example, this can be accomplished by snapping a photograph of a graphical identifier (such as a barcode), or typing in a GUID. Signature acquisition application 280 also includes interfaces capable of acquiring an electronic signature using the techniques disclosed herein. To this end, signature acquisition application 280 is capable of leveraging functionality provided by various components of signature acquisition device 200, such as touch sensitive surface 225 and camera 240. In an alternative implementation, signature acquisition application 280 is omitted and its associated functionality is provided instead by electronic signature server 300. In such alternative implementations, the functionality provided by electronic signature server 300 can be accessed via, for example, a web browser executing on signature acquisition device 200. In this case, such functionality can be accessed with a one-time-password (OTP) that is received from signature application device 100. In particular, signature application device 100 generates a OTP that the user provides to electronic signature server 300 via a web browser executing on signature acquisition device 200. Once the OTP is validated, electronic signature server 300 provides the user with an interface, via the web browser, that allows the signature to be collected.

Referring still to the example embodiment illustrated in FIG. 1, electronic signature server 300 can be configured to manage and orchestrate workflows that enable document 30 (which is present at signature application device 100) to be signed using electronic signature 20 (which is acquired via signature acquisition device 200). Electronic signature server 300 is also optionally configured to store one or more electronic signatures collected from a registered user, and to make the stored signatures available to such user on demand. To this end, in one embodiment electronic signature server 300 comprises an enterprise class server that includes one or more modules configured to implement certain of the functionalities disclosed herein, and optionally further includes hardware configured to enable such implementation. Examples of enabling hardware include a processor 310, a memory 320, a communication module 340, and a bus or interconnect 390. Examples of implementing software include an operating system 330, an application programming interface 350, and a user authentication module 360. Additional or alternative enabling hardware and implementing software can be used in other embodiments.

Processor 310 comprises any suitable processor, and may include one or more coprocessors or controllers, such as an audio processor or a graphics processing unit, to assist in processing operations of electronic signature server 300. Memory 320 is implemented using any suitable type of digital storage, such as one or more of a disk drive, a redundant array of independent disks (RAID), a universal serial bus (USB) drive, flash memory, random access memory (RAM), or any suitable combination of the foregoing. Thus in certain embodiments memory 320 comprises a distributed system of multiple digital storage devices, one or more of which may be remotely located and accessible via network 500. Memory optionally hosts a signature repository 370, which can be used to store electronic signatures acquired from registered users (for longer term storage) and unregistered users (for shorter term storage). Digital assets stored in signature repository 370 are optionally encrypted, for example based on a password that is not retained at electronic signature server 300. Signature repository 370 thus can be understood as providing a highly reliable and security compliant storage resource.

Operating system 330 comprises any suitable operating system, such as UNIX®, LINUX®, MICROSOFT® WINDOWS® (Microsoft Crop., Redmond, Wash.), GOOGLE® ANDROID™ (Google Inc., Mountain View, Calif.), APPLE® iOS (Apple Inc., Cupertino, Calif.), or APPLE® OS X° (Apple Inc., Cupertino, Calif.). As will be appreciated in light of this disclosure, the techniques provided herein can be implemented without regard to the particular operating system provided in conjunction with electronic signature server 300, and therefore may also be implemented using any suitable existing or subsequently developed platform. Communication module 340 is any appropriate network chip or chipset which allows for wired or wireless communication via network 500 to external components and devices, such as signature application device 100, signature acquisition device 200, or document repository 600. Communication module 340 can also be configured to provide intra-device communications via bus or interconnect 390.

Still referring to FIG. 1, application programming interface 350 enables electronic signature server 300 to interact with signature application device 100 and signature acquisition device 200. For example, application programming interface 350 can be configured to receive electronic signature 20 and unique code 10 from signature acquisition device 200. Device identifier 12 and document identifier 14 are optionally represented by unique code 10. The received signature can be associated with a particular user (for example, based on an access token received from a registered user) or a particular device (for example, based on the received device identifier 12). Application programming interface 350 is optionally configured to generate a unique code 10 that is provided to signature application device 100 in the course of a workflow initiation process. Likewise, application programming interface 350 can also be configured to respond to polling requests received from signature application device 100. Such polling requests are intended to identify the presence of any acquired electronic signatures 20 that are associated with signature application device 100. Such electronic signatures can be identified with reference to unique code 10, which can be included in the polling request. In general, application programming interface 350 interacts with corresponding application programming interfaces provided by document viewer 180 at signature application device 100, and signature acquisition application 280 at signature acquisition device 200.

User authentication module 360 comprises instructions encoded on a computer readable medium that, when executed using a processor, cause a user authentication process to be carried out. In one embodiment, the user authentication process authenticates login requests received from signature application device 100 and signature acquisition device 200. Such authentication can be based on, for example, receipt of a trusted token or security credential. As will be appreciated in light of this disclosure, the techniques provided herein can be implemented without regard to the particular user authentication framework provided in conjunction with electronic signature server 300, and therefore may also be implemented using any suitable existing or subsequently developed authentication framework. Still other implementations omit user authentication altogether, and thus provide electronic signature services to unregistered users, as disclosed herein. In certain embodiments an authenticated user is provided with access to his or her previously acquired electronic signatures which may be stored in signature repository 370. This allows an authenticated user who is logged in on both signature application device 100 (for example, the user's desktop computer) and signature acquisition device 200 (for example, the user's smartphone), to bypass the use of a unique code, and to directly access an acquired signature using signature application device 100.

Electronic signature server 300 can communicate with signature application device 100, signature acquisition device 200, and other networked systems or resources via network 500. Network 500 may be a local area network (such as a home-based or office network), a wide area network (such as the Internet), a peer-to-peer network (such as a Bluetooth connection), or a combination of such networks, whether public, private, or both. In certain embodiments at least a portion of the functionality associated with network 500 is provided by a cellular data network, thereby making it easier for users of mobile computing devices to leverage networked resources. For instance, in one embodiment unique code 10 or a OTP used to access functionality provided by electronic signature server 300 is submitted to signature acquisition device 200 using a short message service (SMS). In general, communications amongst the various entities and resources described herein may occur via wired or wireless connections, such as may be provided by Wi-Fi or mobile data networks. In some cases access to resources on a given network or computing system may require credentials such as a username and password, or may require compliance with any other suitable security mechanism.

The embodiments described herein can be implemented in various forms of hardware, software, firmware, or special purpose processors. For example, in one embodiment a non-transitory computer readable medium has instructions encoded thereon that, when executed by one or more processors, cause aspects of the electronic signature framework described herein to be implemented. The instructions can be encoded using any suitable programming language, such as C, C++, object-oriented C, Java, JavaScript, Visual Basic .NET, BASIC, Scala, or alternatively, using custom or proprietary instruction sets. Such instructions can be provided in the form of one or more computer software applications or applets that are tangibly embodied on a memory device, and that can be executed by a computer having any suitable architecture. In one embodiment the system can be hosted on a given website and implemented, for example, using JavaScript or another suitable browser-based technology.

The functionalities disclosed herein can optionally be incorporated into a variety of different software applications, including word processing applications, email clients, document viewer applications, digital imaging applications, and content management systems. The functionalities disclosed herein can additionally or alternatively leverage services provided by separate software applications, such as digital camera applications, barcode scanning applications, and text messaging applications. The computer software applications disclosed herein may include a number of different modules, sub-modules, or other components of distinct functionality, and can provide information to, or receive information from, still other components and services. These modules can be used, for example, to communicate with input/output devices such as a display screen, a touch sensitive surface, a digital camera, or any other suitable input/output device. Other components and functionality not reflected in the illustrations will be apparent in light of this disclosure, and it will be appreciated that the present disclosure is not intended to be limited to any particular hardware or software configuration. Thus in other embodiments the components illustrated in FIG. 1 may include additional, fewer, or alternative subcomponents.

The aforementioned non-transitory computer readable medium may be any suitable medium for storing digital information, such as a hard drive, a server, a flash memory, RAM, or any suitable combination of the foregoing. In alternative embodiments, the computers and modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used in this regard, and that the present disclosure is not intended to be limited to any particular system architecture.

Methodology: Unregistered User

Figure 2B:
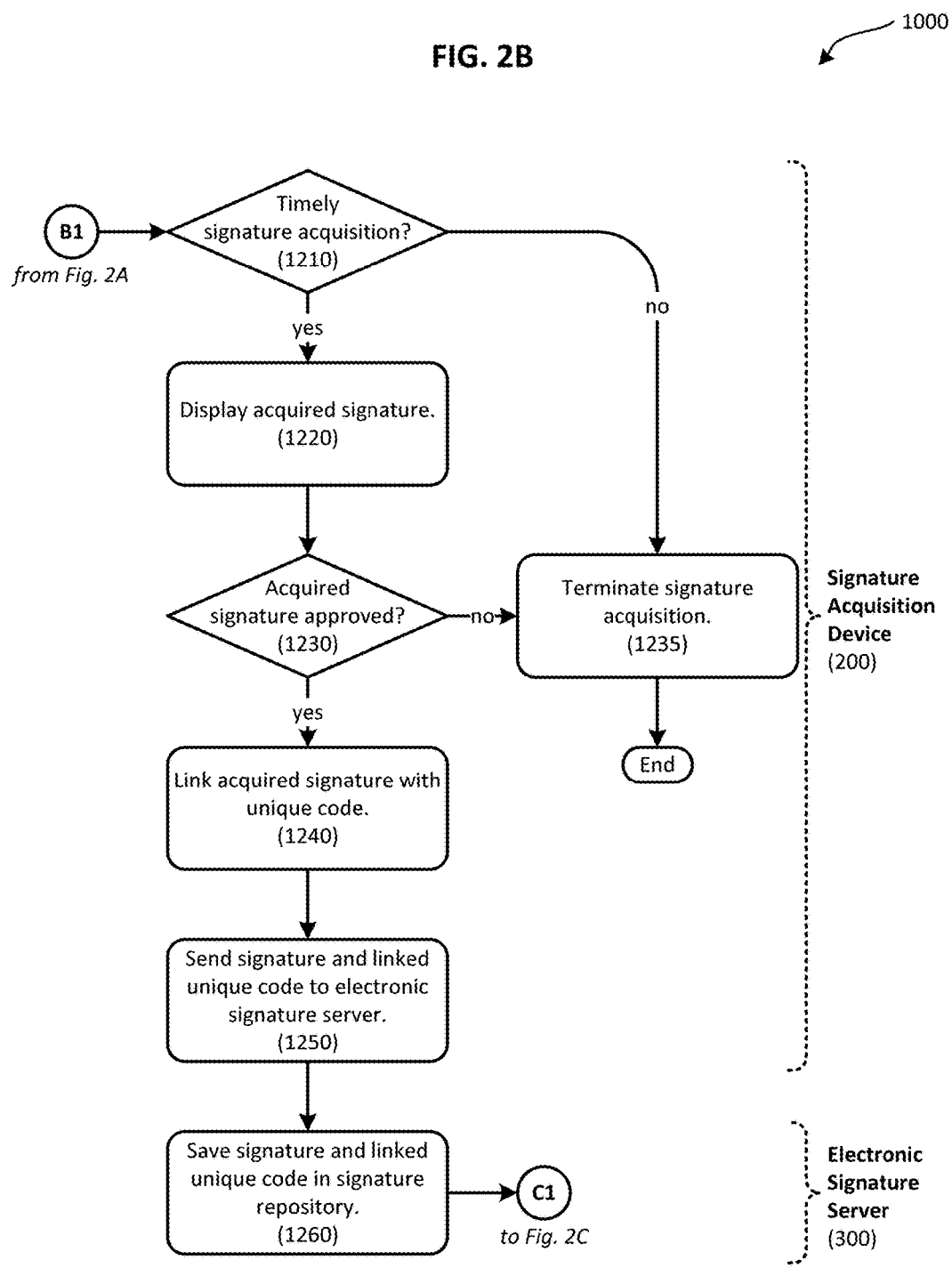
Figure 2C:
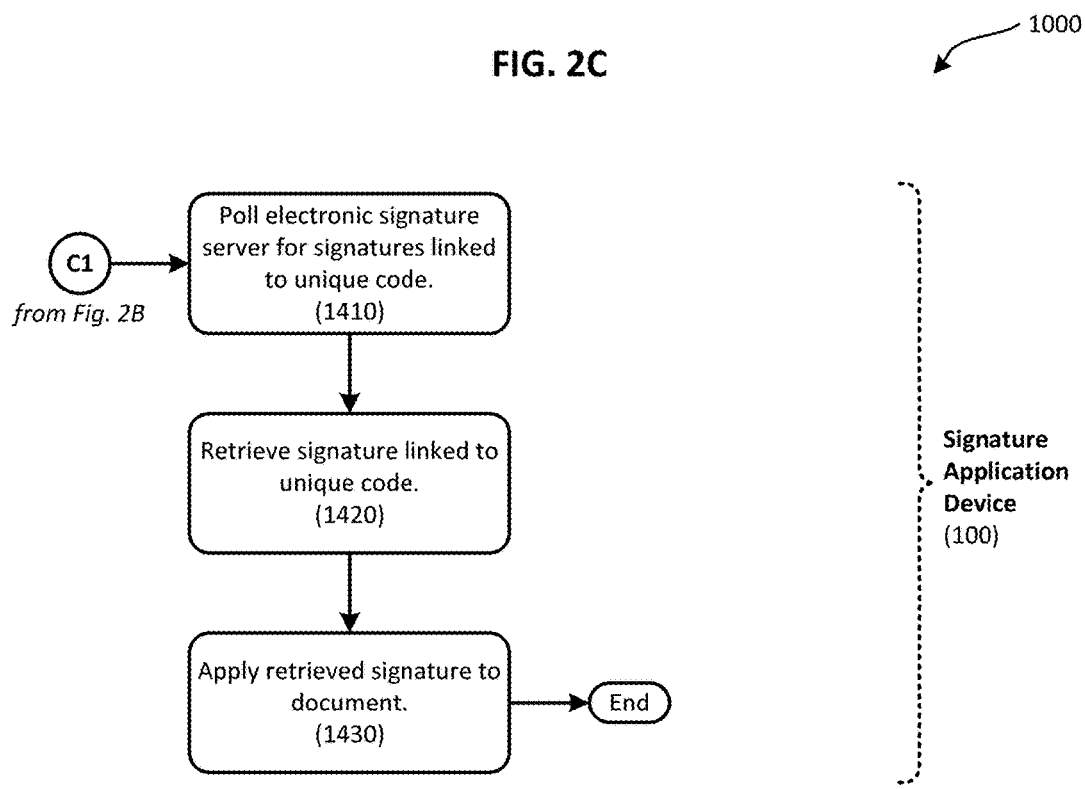

FIGS. 2A through 2C comprise a flowchart illustrating an example method 1000 that allows an unregistered user to apply electronic signature 20 to document 30 that is displayed on signature application device 100, wherein electronic signature 20 is acquired using signature acquisition device 200. As can be seen, method 1000 includes a number of phases and sub-processes, the sequence of which may vary from one embodiment to another. However, when considered in the aggregate, these phases and sub-processes form part of an improved electronic signature framework that allows electronic signature 20 to be applied to document 30 using multiple devices. Method 1000, which is responsive to user input as described herein, can be implemented using the electronic signature framework illustrated in FIG. 1. However other system architectures can be used in other embodiments, as will be apparent in light of this disclosure. To this end, the correlation of the various functionalities shown in FIGS. 2A through 2C to the specific devices illustrated in FIG. 1 is not intended to imply any structural or use limitations. Rather, other embodiments may include, for example, varying degrees of integration wherein multiple functionalities are effectively performed by one resource or component. For example, in an alternative embodiment signature application device 100 includes a local document and signature repository, thereby rendering other instances of such resources optional. Thus other embodiments may have fewer or more components depending on the granularity of implementation. Numerous variations and alternative configurations will therefore be apparent in light of this disclosure.

As illustrated in FIG. 2A, method 1000 commences with using signature application device 100 to display document 30. See reference numeral 1110 in FIG. 2A. A large-format display 120 associated with signature application device 100 makes it easier for a user to review document 30. Document 30 can be displayed using document viewer 180 or any other suitable software application, such as a web browser, a word processor, or a digital imaging tool. The particular software used to display document 30 depends on the type of document that is displayed. In some implementations documents 30 is retrieved from a local repository or a cloud-based document repository 600, while in other implementations document 30 is received via email or any other suitable messaging service. Receipt of document 30 may form part of an overarching electronic signature workflow in which a user of signature application device 100 is requested to sign document 30. In some cases document 30 may be authored by the intended signatory, such as an author wishing to sign his or her own work.

Upon deciding that document 30 is ready to be signed, the user invokes a mobile signature command that is received by signature application device 100. See reference numeral 1120 in FIG. 2A. The mobile signature command indicates that an electronic signature is to be acquired using a different device, namely, signature acquisition device 200. In one embodiment the mobile signature command is received in response to a user selecting a mobile signature command element (icon) that is provided by document viewer 180, although other user interface elements can be invoked in other embodiments.

In response to receiving the mobile signature command, signature application device 100 generates unique code 10. See reference numeral 1140 in FIG. 2A. More specifically, unique code 10 can be generated by token manager 182, which forms part of document viewer 180. In an alternative embodiment, unique code 10 is requested from, generated by, and received from electronic signature server 300. In one embodiment, unique code 10 is encoded with a device identifier 12 that identifies the device that was used to generate unique code 10. Unique code 10 is also optionally encoded with a document identifier 14 that identifies a document that was being viewed using document viewer 180 when unique code 10 was generated. In alternative embodiments unique code 10 includes neither device identifier 12 nor document identifier 14, but instead comprises a randomly generated unique identifier. In certain implementations unique code 10 is rendered in the form of a two-dimensional barcode provided on display 120, although in other embodiments other representations can be used, such as a GUID that is displayed as 32 hexadecimal digits. In still other embodiments unique code 10 is not displayed at all, but instead is delivered directly to signature acquisition device 200 via, for example, an SMS. In this case invoking the mobile signature command results in the user being prompted for a mobile telephone number associated with signature acquisition device 200. FIG. 4A is a screenshot illustrating an example document viewer user interface 184 that can be displayed using signature application device 100. Document viewer user interface 184 displays unique code 10 in response to selection of a mobile signature command element 186.

As noted previously, signature acquisition device 200 is used to acquire an electronic signature that is to be applied to document 30. To accomplish this, signature acquisition application 280 is launched on signature acquisition device 200. See reference number 1150 in FIG. 2A. Signature acquisition application 280 is then used to receive unique code 10. See reference numeral 1160 in FIG. 2A and workflow process ① in FIG. 1. This can be accomplished in a number of ways, including by optically scanning a barcode displayed on display 120 of signature application device 100, by receiving a typed GUID or other alphanumeric code, by receiving a text message or other electronic communication containing unique code 10, or by transcribing a spoken code. Thus in certain embodiments signature acquisition application 280 leverages hardware associated with signature acquisition device 200, such as touch sensitive surface 225 (in the case of a code typed into a virtual keyboard) or camera 240 (in the case of an optically scanned barcode).

Figure 4B:
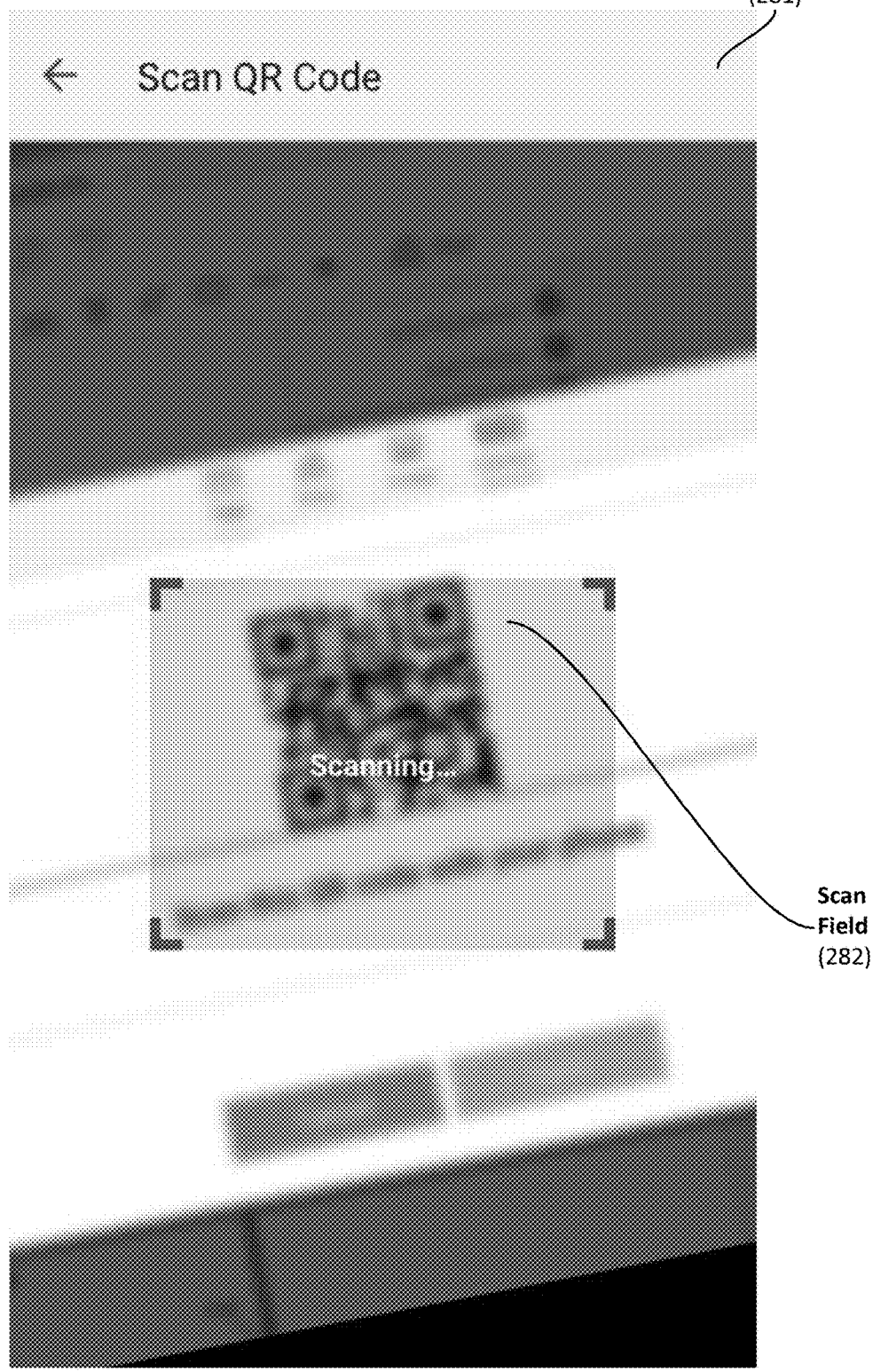
FIG. 4B is a screenshot illustrating an example user interface that is provided on a signature acquisition device, and that enables the unique code of FIG. 4A to be scanned using the signature acquisition device.

For example, FIG. 4B is a screenshot illustrating a unique code acquisition user interface 281 that is provided by signature acquisition application 280. Unique code acquisition user interface 281 includes a scan field 282 that can be used in conjunction with camera 240 to optically scan a barcode, such as a two-dimensional barcode, that is rendered on display 120 of signature application device 100. In other words, a user can display a barcode on his or her desktop computer, and then scan the displayed barcode using his or her smartphone. Where unique code 10 includes device identifier 12 (and optionally document identifier 14), providing unique code 10 to signature acquisition device 200 includes identifying signature application device 100 (and optionally document 30) to signature acquisition device 200. In an alternative embodiment, unique code 10 includes neither device identifier 12 nor document identifier 14, but instead simply provides a way for electronic signature server 300 to enable an acquired electronic signature to be transmitted from signature acquisition device 200 to signature application device 100.

Figure 4C:
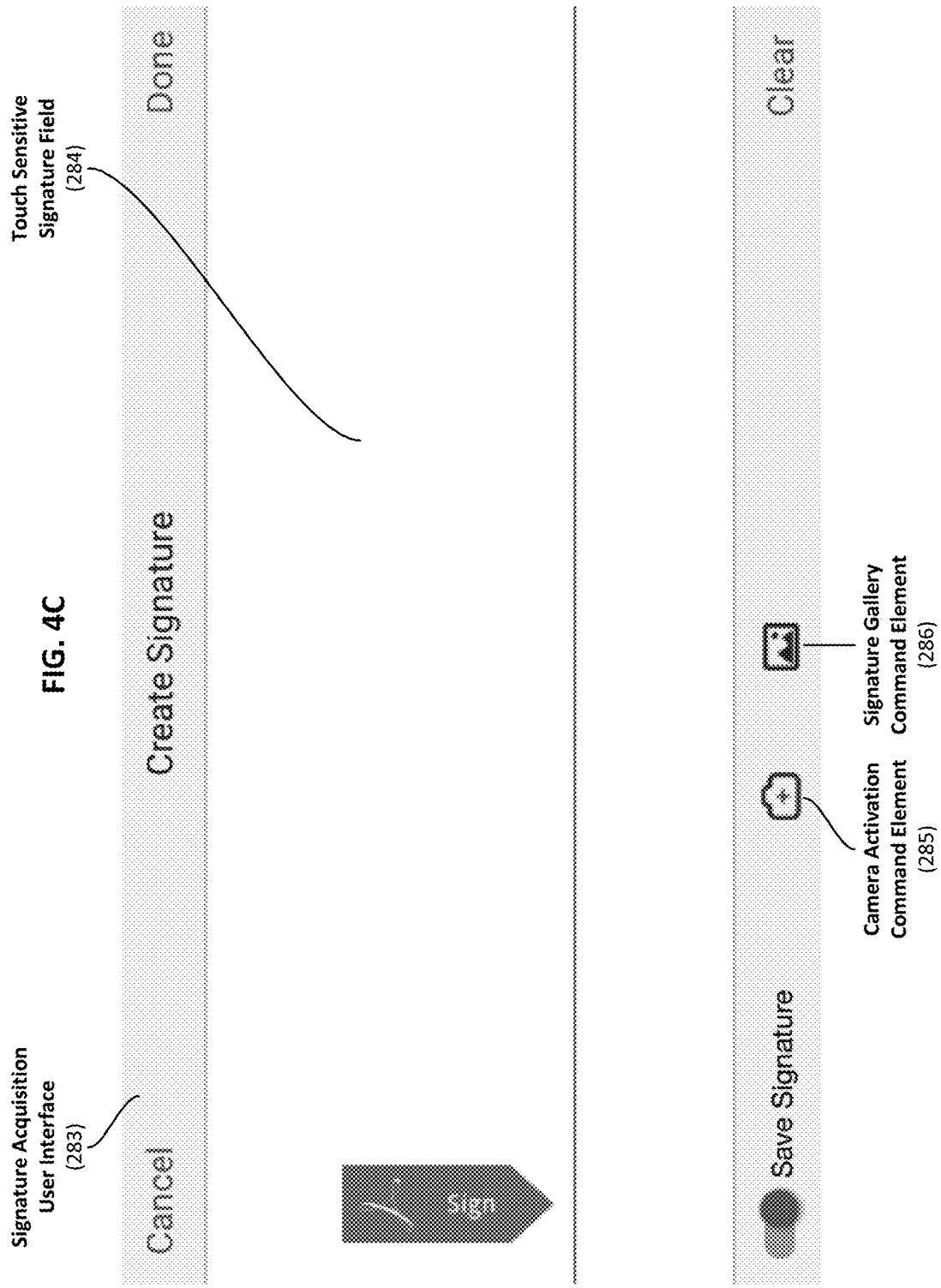
FIG. 4C is a screenshot illustrating an example user interface that is provided on a signature acquisition device in response to scanning the unique code of FIG. 4A, wherein the user interface facilitates the creation of an electronic signature.

Once signature acquisition application 280 has received unique code 10, it can acquire electronic signature 20. See reference numeral 1170 in FIG. 2A. Electronic signature 20 can be acquired in a number of different ways, such as by using touch sensitive surface 225 to receive a handwritten signature, by using camera 240 to snap a photograph of a signature written on a piece of paper or other surface, or by accessing a storage repository in which an image of a signature is stored. FIG. 4C is a screenshot illustrating a signature acquisition user interface 283 that is provided by signature acquisition application 280. Signature acquisition user interface 283 includes a touch sensitive signature field 284 onto which a user can draw a handwritten signature. Signature acquisition user interface 283 also optionally includes a camera activation command element 285 which is configured to activate camera 240, thus enabling a user to snap a photograph of a signature written on a piece of paper or other surface. Signature acquisition user interface 283 also optionally includes a signature gallery command element 286 which is configured to access a gallery comprising images of previously acquired signatures. In certain implementations such a gallery is locally hosted at signature acquisition device 200. Once the user acquires electronic signature 20 using one of these techniques, or any other suitable technique, the user is provided an opportunity to review the acquired signature 20 and invoke a process whereby signature 20 is sent to another computer, as will be described in turn.

In some cases signature acquisition application 280 is capable of acquiring signature 20 for only a limited period of time after receiving unique code 10. In this context, examples of "a limited period of time" include 30 seconds, 1 minute, 2 minutes, 3 minutes, 5 minutes, 10 minutes, 15 minutes, and 30 minutes. Other time periods can be used in other embodiments. Implementing such a restriction makes it more difficult for the signature recording session to be hijacked or otherwise diverted by an unauthorized user. Thus in certain embodiments signature acquisition device 200, and more specifically signature acquisition application 280, makes a determination as to whether signature 20 was acquired in a timely manner. See reference numeral 1210 in FIG. 2B. If not, the signature acquisition process terminates. See reference numeral 1235 in FIG. 2B. This timeliness determination is optionally later reviewed and verified by electronic signature server 300, thus reducing the likelihood control of signature acquisition device is hijacked by a malicious attacker. Otherwise, the acquired signature 20 is displayed, for example using touch sensitive surface 225. See reference numeral 1220 in FIG. 2B. This provides the user with an opportunity to review and approve signature 20. A determination is made with respect to whether the user has approved the displayed signature 20. See reference numeral 1230 in FIG. 2B. If not, the signature acquisition process terminates. See reference numeral 1235 in FIG. 2B.

Signature acquisition device 200 links the acquired signature 20 with unique code 10. See reference numeral 1240 in FIG. 2B. Where unique code 10 includes device identifier 12 or document identifier 14, this effectively associates the acquired signature 20 with signature application device 100 or document 30, respectively. A link to a particular document may be particularly useful in implementations where a user of signature application device 100 is working with many different documents. However, even where device identifier 12 is used, a randomly generated unique code is also provided, thus making it more difficult for a malicious hacker to hijack signature acquisition device and generating electronic signatures with a misappropriated device identifier. And a particular document identifier 14 is not required either, since unique code 10 is randomly generated, meaning that multiple signature acquisition operations will each have their own unique code.

The link between unique code 10 and the acquired signature 20 may be provided in the form of metadata included in a file used to store signature 20. Once the acquired signature 20 is linked with unique code 10, the linked signature can be sent to electronic signature server 300. In one implementation, this is accomplished by sending both the acquired signature 20 and the unique code 10 to electronic signature server 300. See reference numeral 1250 in FIG. 2B and workflow process ② in FIG. 1. Upon receipt, electronic signature server 300 stores the acquired signature 20 and the unique code 10 in signature repository 370. See reference numeral 1260 in FIG. 2B. In an alternative embodiment, the acquired signature 20 is transmitted directly from signature acquisition device 200 to signature application device 100, bypassing and rendering optional electronic signature server 300. The link between unique code 10 and the acquired signature 20 is optionally stored only temporarily, and thus may be deleted either (a) automatically after a designated time interval, or (b) once the acquired signature 20 is used by signature application device 100.

Figure 4D:
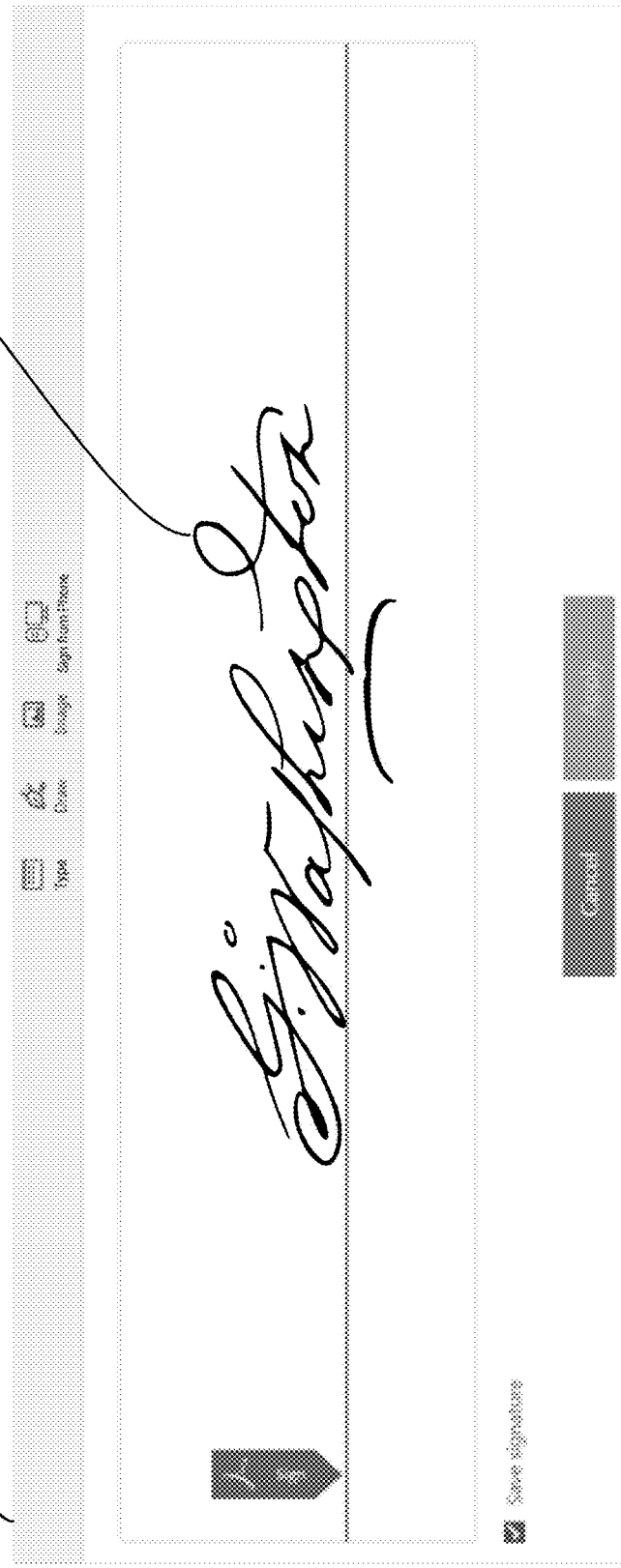
FIG. 4D is a screenshot illustrating an example user interface that is provided on a signature application device in response to receiving an electronic signature that was created at the signature acquisition device using the user interface of FIG. 4C.

Once a mobile signature command is received at signature application device 100, it can be assumed that a signature will be acquired and ready to be submitted to signature application device 100 in a relatively short period of time. This is particularly so in implementations wherein signature acquisition application 280 is capable of acquiring signature 20 for only a limited period of time after receiving unique code 10. In some cases signature application device 100 can be configured to periodically poll electronic signature server 300 for the existence of any signatures in signature repository 370 that are linked to unique code 10. See reference numeral 1410 in FIG. 2C. In such embodiments signature application device 100 retrieves any such signatures from electronic signature server 300. See reference numeral 1420 in FIG. 2C and workflow process ③ in FIG. 1. Document viewer 180 can then be used to apply the retrieved signature 20 to document 30. See reference numeral 1430 in FIG. 2C. FIG. 4D is a screenshot illustrating document viewer user interface 184 after acquired signature 20 is retrieved from electronic signature server 300. As compared with the screenshot provided in FIG. 4A, unique code 10 has been replaced with acquired signature 20. In some implementations, document viewer user interface 184 provides flexibility with respect to how and where the acquired signature 20 is applied to document 30, while in other implementations the acquired signature 20 can only be applied at a particular predesignated location.

Method 1000 advantageously allows acquired signature 20 to be synchronized between signature acquisition device 200 and signature application device 100 automatically and securely. Document 30 is maintained at signature application device 100, thus reducing the likelihood that its contents can be intercepted or otherwise accessed by an unauthorized party during transmission. Furthermore, because the temporarily-active unique code 10 provides a link between signature application device 100 and acquired signature 20, it is unnecessary for a user to register or login to obtain the benefits of such embodiments.

Methodology: Registered User

Figure 3A:
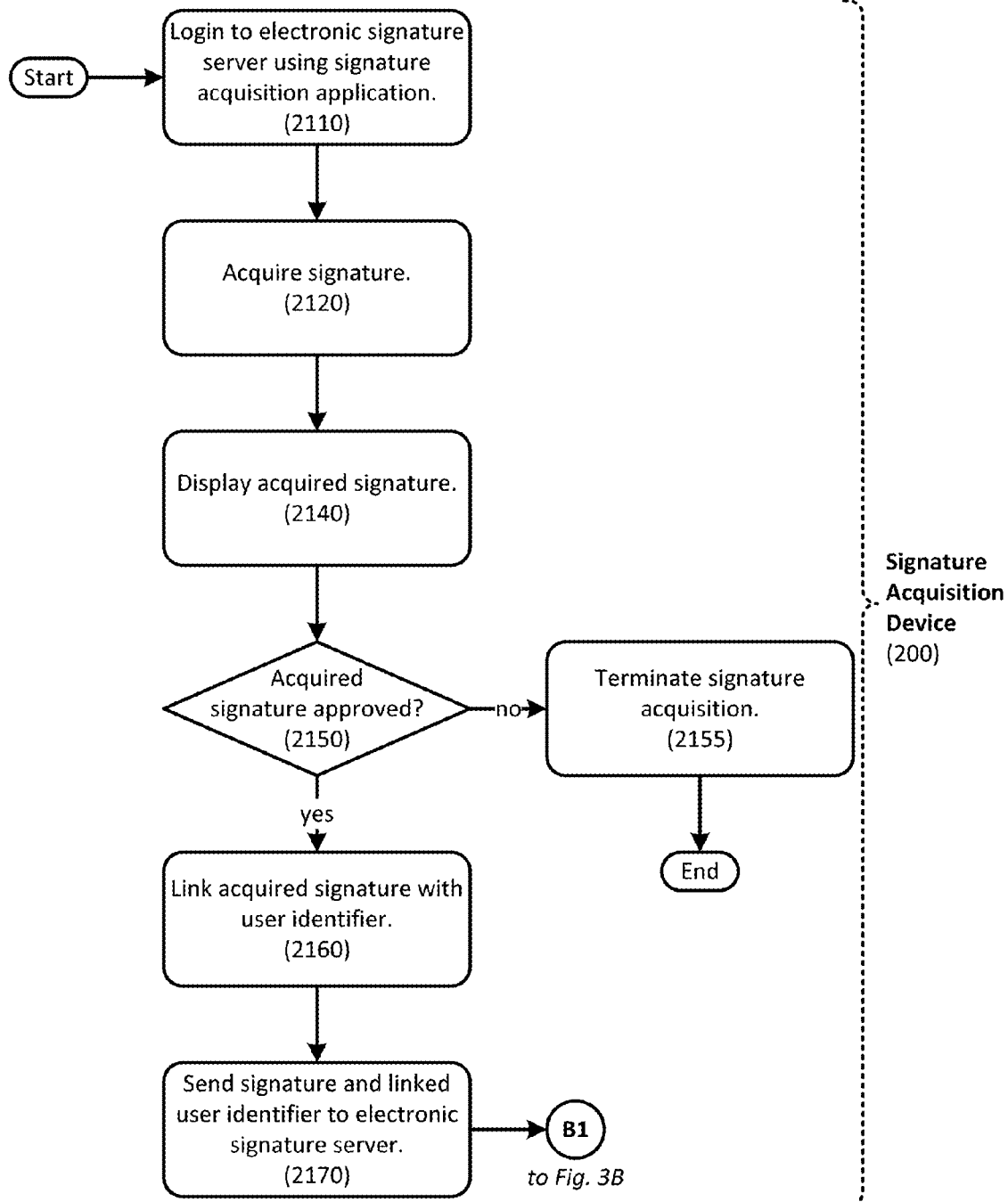

FIGS. 3A and 3B comprise a flowchart illustrating an example method 2000 that allows a registered user to apply electronic signature 20 to document 30 that is displayed on signature application device 100, wherein electronic signature 20 is acquired using signature acquisition device 200. As can be seen, method 2000 includes a number of phases and sub-processes, the sequence of which may vary from one embodiment to another. However, when considered in the aggregate, these phases and sub-processes form part of an improved electronic signature framework that allows electronic signature 20 to be applied to document 30 using multiple devices. Method 2000, which is responsive to user input as described herein, can be implemented using the electronic signature framework illustrated in FIG. 1. However other system architectures can be used in other embodiments, as will be apparent in light of this disclosure. To this end, the correlation of the various functionalities shown in FIGS. 3A and 3B to the specific devices illustrated in FIG. 1 is not intended to imply any structural or use limitations. Rather, other embodiments may include, for example, varying degrees of integration wherein multiple functionalities are effectively performed by one resource or component. For example, in an alternative embodiment signature application device 100 includes a local document and signature repository, thereby rendering other instances of such resources optional. Thus other embodiments may have fewer or more components depending on the granularity of implementation. Numerous variations and alternative configurations will therefore be apparent in light of this disclosure.

As illustrated in FIG. 3A, method 2000 commences with a user submitting a login credential to electronic signature server 300 via signature acquisition application 280 executing on signature acquisition device 200. See reference numeral 2110 in FIG. 3A. In such embodiments the user authentication process invoked by user authentication module 360 authenticates the submitted login credential and provides an authenticated user with access to server resources. Signature acquisition application 280 can also be configured to acquire electronic signature 20 from the user. See reference number 2120 in FIG. 3A. Electronic signature 20 can be acquired in a number of different ways, such as by using touch sensitive surface 225 to receive a handwritten signature, by using camera 240 to snap a photograph of a signature written on a piece of paper or other surface, or by accessing a storage repository in which an image of a signature is stored. FIG. 4C is a screenshot illustrating a signature acquisition user interface 283 that is provided by signature acquisition application 280. The acquired signature 20 is optionally displayed, for example using touch sensitive surface 225. See reference number 2140 in FIG. 3A. This provides the user with an opportunity to review and approve signature 20. A determination is made with respect to whether the user has approved the displayed signature 20. See reference numeral 2150 in FIG. 3A. If not, the signature acquisition process terminates. See reference numeral 2155 in FIG. 3A.

Signature acquisition device 200 links the acquired signature with a user identifier that identifies the previously authenticated user. See reference numeral 2160 in FIG. 3A. Such a link may be provided in the form of metadata included in a file used to store signature 20. The resulting linked signature is then sent to electronic signature server 300. See reference numeral 2170 in FIG. 3A. Upon receipt, electronic signature server 300 stores the acquired signature 200 and the linked user identifier in signature repository 370. See reference numeral 2210 in FIG. 3B.

In addition to submitting a login credential to electronic signature server 300 via signature acquisition application 280 executing on signature acquisition device 200, a registered user can submit an equivalent login credential to electronic signature server via document viewer application 180 executing on signature application device 100. See reference numeral 2220 in FIG. 3B. While FIGS. 3A and 3B illustrate that the login credential is submitted via signature acquisition device 200 before being submitted via signature application device 100, other submission sequences, including simultaneous submission, can be invoked in other embodiments. In general, the user will be understood as authenticating himself or herself via both devices, thus providing electronic signature server 300 with a link between a user who provided an acquired signature 20 from electronic signature acquisition device 200, and that same user having authenticated himself or herself via electronic signature application device 100. More specifically user authentication at signature acquisition device 200 is used to securely add, remove, or manage electronic signatures, while user authentication at signature application device 100 is used to fetch a previously acquired signature from electronic signature server 300. Thus once the user has authenticated himself or herself at signature application device 100, he or she can retrieve a list of signatures linked to his or her user identifier. See reference numeral 2230 in FIG. 3B.

Once the user is presented with a list of previously acquired signatures that is linked to his or her user identifier, a desired signature 20 can be selected from such list. See reference numeral 2240 in FIG. 3B. The selected signature is retrieved from electronic signature server 300, and document viewer 180 is used to apply signature 20 to document 30. See reference numeral 2250 in FIG. 3B. FIG. 4D is a screenshot illustrating document viewer user interface 184 after the selected signature 20 is retrieved from electronic signature server 300. In some implementations, document viewer user interface 184 provides flexibility with respect to how and where the acquired signature 20 is applied to document 30, while in other implementations the acquired signature 20 can only be applied at a particular predesignated location.

Thus the user's registration and login from both devices enables an acquired signature 20 to be passed from one device to another, thereby allowing use of unique code 10 to be bypassed. An access token associated with the registered user therefore permits an acquired signature to be stored in association with the registered user's profile at electronic signature server 300. Thus, for registered users, an acquired signature can be synchronized across multiple devices automatically. Indeed, from the perspective of a user who has authenticated himself or herself to both devices, immediately after signature 20 is acquired at signature acquisition device 200, it is made available at signature application device 100. There is no need for the registered user to send documents between the devices or to otherwise manually synchronize signatures.

Further Example Embodiments

Numerous variations and configurations will be apparent in light of this disclosure. For instance, as illustrated by FIG. 5, one example embodiment provides a non-transitory computer readable medium having instructions encoded thereon that, when executed by one or more processors, cause an electronic signature process 5000 to be carried out. As illustrated in FIG. 5, in one example embodiment electronic signature process 5000 includes using a first computing device to display at least a portion of an electronic document. See reference numeral 5100 in FIG. 5. See also reference numeral 1110 in FIG. 2A, which indicates that method 1000 for acquiring and applying an electronic signature includes displaying a document on a signature application device.

Process 5000 further includes, in response to receiving a mobile signature command at the first computing device, generating a unique code that includes a device identifier that identifies the first computing device. See reference numeral 5200 in FIG. 5. See also reference numeral 1140 in FIG. 2A, which indicates that method 1000 for acquiring and applying an electronic signature includes using a signature application device to generate a unique code that includes a device identifier for the signature application device.

Process 5000 further includes providing the unique code and the device identifier to a second computing device. See reference numeral 5300 in FIG. 5. See also reference numeral 1160 in FIG. 2A, which indicates that method 1000 for acquiring and applying an electronic signature includes receiving a unique code at a signature acquisition device.

Process 5000 further includes, in response to receiving the unique code and the device identifier at the second computing device, activating a signature acquisition user interface at the second computing device. See reference numeral 5400 in FIG. 5. See also reference numerals 1160 and 1170 in FIG. 2A, which indicate that method 1000 for acquiring and applying an electronic signature includes receiving a unique code at a signature acquisition device and acquiring an electronic signature. The electronic signature can be acquired using a signature acquisition user interface, such as that illustrated in FIG. 4C.

Process 5000 further includes acquiring an electronic signature via the signature acquisition user interface. See reference numeral 5500 in FIG. 5. See also reference numeral 1170 in FIG. 2A, which indicates that method 1000 for acquiring and applying an electronic signature includes acquiring an electronic signature at a signature acquisition device. The electronic signature can be acquired using a signature acquisition user interface, such as that illustrated in FIG. 4C.

Process 5000 further includes sending the acquired electronic signature to the first computing device, as identified by the device identifier. See reference numeral 5600 in FIG. 5. See also reference numerals 1250, 1260, 1410, and 1420 in FIGS. 2B and 2C, which indicate that method 1000 for acquiring and applying an electronic signature includes sending an acquired signature from a signature acquisition device to an electronic signature server, and retrieving the electronic signature from the electronic signature server by a signature application device.

In some cases the unique code is selected from a group consisting of a barcode, an alphanumeric code, and an audibly-rendered passphrase. In some cases the signature acquisition user interface is configured to become inactive in response to failure to acquire any electronic signature within a designated time period. In some cases the acquired electronic signature is sent to the first computing device via an electronic signature server. In some cases the electronic signature process further includes providing a one-time-password that enables the second computing device to access signature acquisition functionality hosted by an electronic signature server. In some cases the electronic signature process further includes (a) displaying the unique code on a display device that is in communication with the first computing device; and (b) optically scanning the displayed unique code using a camera that is integrated into the second computing device. In some cases the electronic signature process further includes, in response to receiving the mobile signature command, prompting a user for a telephone number associated with the second computing device. In some cases providing the unique code and the device identifier to the second computing device comprises sending a message to the second computing device using a telephone number associated with the second computing device. In some cases providing the unique code and the device identifier to the second computing device comprises typing an alphanumeric code using the second computing device. In some cases (a) the first computing device is selected from a group consisting of a desktop computer, a laptop computer, and a netbook; (b) the first computing device lacks at least one of a touch sensitive surface and an integrated camera; (c) the second computing device is selected from a group consisting of a smartphone and a tablet computer; and (d) the second computing device includes at least one of a touch sensitive surface and an integrated camera.

Another example embodiment provides an electronic signature system. The electronic signature system includes a memory device and a processor that is operatively coupled to the memory device. The processor is configured to execute instructions stored in the memory device that, when executed, cause the processor to carry out an electronic signature process. The electronic signature process includes receiving, from a signature acquisition device, an electronic signature that is linked to a unique code. The electronic signature process further includes storing the received electronic signature in a signature repository. The received electronic signature is associated with the unique code in the signature repository. The electronic signature process further includes receiving, from a signature application device, a signature request that includes the unique code. The electronic signature process further includes sending the electronic signature to the signature application device. In some cases the electronic signature that is linked to the unique code includes metadata that identifies the signature application device. In some cases (a) the electronic signature received from the signature acquisition device is further linked to a user identifier that identifies a particular user; (b) the signature request received from the signature application device is associated with the particular user; and (c) the electronic signature process further comprises (i) identifying a plurality of electronic signatures that are stored in the signature repository and that are associated with the particular user, and (ii) sending a list of the plurality of electronic signatures to the signature application device. In some cases the electronic signature server hosts the signature repository.

Another example embodiment provides a computer-implemented method. The method includes receiving, at a signature acquisition device, a unique code that identifies a signature application device. The method further includes, in response to receiving the unique code, activating a signature acquisition user interface on the signature acquisition device. The method further includes acquiring an electronic signature via the signature acquisition user interface. The method further includes sending a transmission to an electronic signature server. The transmission includes the acquired electronic signature and a device identifier that identifies the signature application device. In some cases the unique code is a two-dimensional barcode. In some cases the signature acquisition user interface is configured to generate the electronic signature by capturing a digital photograph of a handwritten signature. In some cases the signature acquisition user interface is activated for a limited time period that is selected from a group consisting of less than ten minutes, less than eight minutes, less than five minutes, less than three minutes, less than two minutes, and less than one minute. In some cases the signature acquisition user interface is configured to generate the electronic signature based on detection of a handwritten signature drawn on a touch sensitive surface that forms part of the signature acquisition device. In some cases receiving the unique code comprises scanning a two-dimensional barcode displayed by the signature application device.

The foregoing disclosure has been presented for the purposes of illustration and description. It is not intended to be exhaustive or to limit the description to the particular described embodiments. Therefore many modifications and variations are possible in light of this disclosure. Thus it is intended that the scope of the invention be limited not by this disclosure, but rather by the claims appended hereto.

What is claimed is:

1. A non-transitory computer readable medium having instructions encoded thereon that, when executed by one or more processors, cause an electronic signature process to be carried out, the process comprising:
   using a first computing device to display at least a portion of an electronic document;
   in response to receiving a mobile signature command at the first computing device, generating a unique code that includes a device identifier that identifies the first computing device;
   providing the unique code to a second computing device;
   in response to receiving the unique code at the second computing device, activating a signature acquisition user interface at the second computing device;
   acquiring an electronic representation of a handwritten signature via the signature acquisition user interface;
   linking the acquired electronic representation of the handwritten signature to the unique code;
   sending the acquired electronic representation of the handwritten signature and the linked unique code from the second computing device to an electronic signature server;
   sending a signature request from the first computing device to the electronic signature server, wherein the signature request is associated with the unique code;
   receiving, from the electronic signature server, by the first computing device, the acquired electronic representation of the handwritten signature; and
   using the first computing device to apply the acquired electronic representation of the handwritten signature to the electronic document.

2. The non-transitory computer readable medium of claim 1, wherein the unique code is selected from a group consisting of a barcode, an alphanumeric code, and an audibly-rendered passphrase.

3. The non-transitory computer readable medium of claim 1, wherein the signature acquisition user interface is configured to become inactive in response to failure to acquire any electronic representation of any handwritten signature within a designated time period.

4. The non-transitory computer readable medium of claim 1, the electronic signature process further comprising receiving a user approval of the acquired electronic representation of the handwritten signature before the acquired electronic representation of the handwritten signature is sent to the electronic signature server from the second computing device.

5. The non-transitory computer readable medium of claim 1, the electronic signature process further comprising providing a one-time-password that enables the second computing device to access signature acquisition functionality hosted by the electronic signature server.

6. The non-transitory computer readable medium of claim 1, the electronic signature process further comprising:
   displaying the unique code on a display device that is in communication with the first computing device; and
   optically scanning the displayed unique code using a camera that is integrated into the second computing device.

7. The non-transitory computer readable medium of claim 1, the electronic signature process further comprising, in response to receiving the mobile signature command, prompting a user for a telephone number associated with the second computing device.

8. The non-transitory computer readable medium of claim 1, wherein providing the unique code to the second computing device comprises sending a message to the second computing device using a telephone number associated with the second computing device.

9. The non-transitory computer readable medium of claim 1, wherein providing the unique code to the second computing device comprises typing an alphanumeric code using the second computing device.

10. The non-transitory computer readable medium of claim 1, wherein:
   the first computing device is selected from a group consisting of a desktop computer, a laptop computer, and a netbook;
   the first computing device lacks at least one of a touch sensitive surface and an integrated camera;
   the second computing device is selected from a group consisting of a smartphone and a tablet computer; and
   the second computing device includes at least one of a touch sensitive surface and an integrated camera.

11. A computer-implemented method comprising:
   receiving, at a signature acquisition device, a unique code that identifies a signature application device;
   in response to receiving the unique code, activating a signature acquisition user interface on the signature acquisition device;
   acquiring an electronic representation of a handwritten signature via the signature acquisition user interface;
   causing the signature acquisition user interface to display the electronic representation of the handwritten signature;

receiving a user approval of the electronic representation of the handwritten signature; and in response to receiving the user approval, sending a transmission to an electronic signature server, the transmission including the acquired electronic representation of the handwritten signature and a device identifier that identifies the signature application device.

12. The method of claim 11, wherein the unique code is a two-dimensional barcode.

13. The method of claim 11, wherein the signature acquisition user interface is configured to generate the electronic representation of the handwritten signature by capturing a digital photograph of the handwritten signature using a camera that is integrated into the signature acquisition device.

14. The method of claim 11, wherein the signature acquisition user interface is activated for a limited time period that is selected from a group consisting of less than ten minutes, less than eight minutes, less than five minutes, less than three minutes, less than two minutes, and less than one minute.

15. The method of claim 11, wherein the signature acquisition user interface is configured to generate the electronic representation of the handwritten signature based on detection of the handwritten signature drawn on a touch sensitive surface that forms part of the signature acquisition device.

16. The method of claim 11, wherein receiving the unique code comprises scanning a two-dimensional barcode displayed by the signature application device.

* * * * *